Patented Mar. 18, 1924.

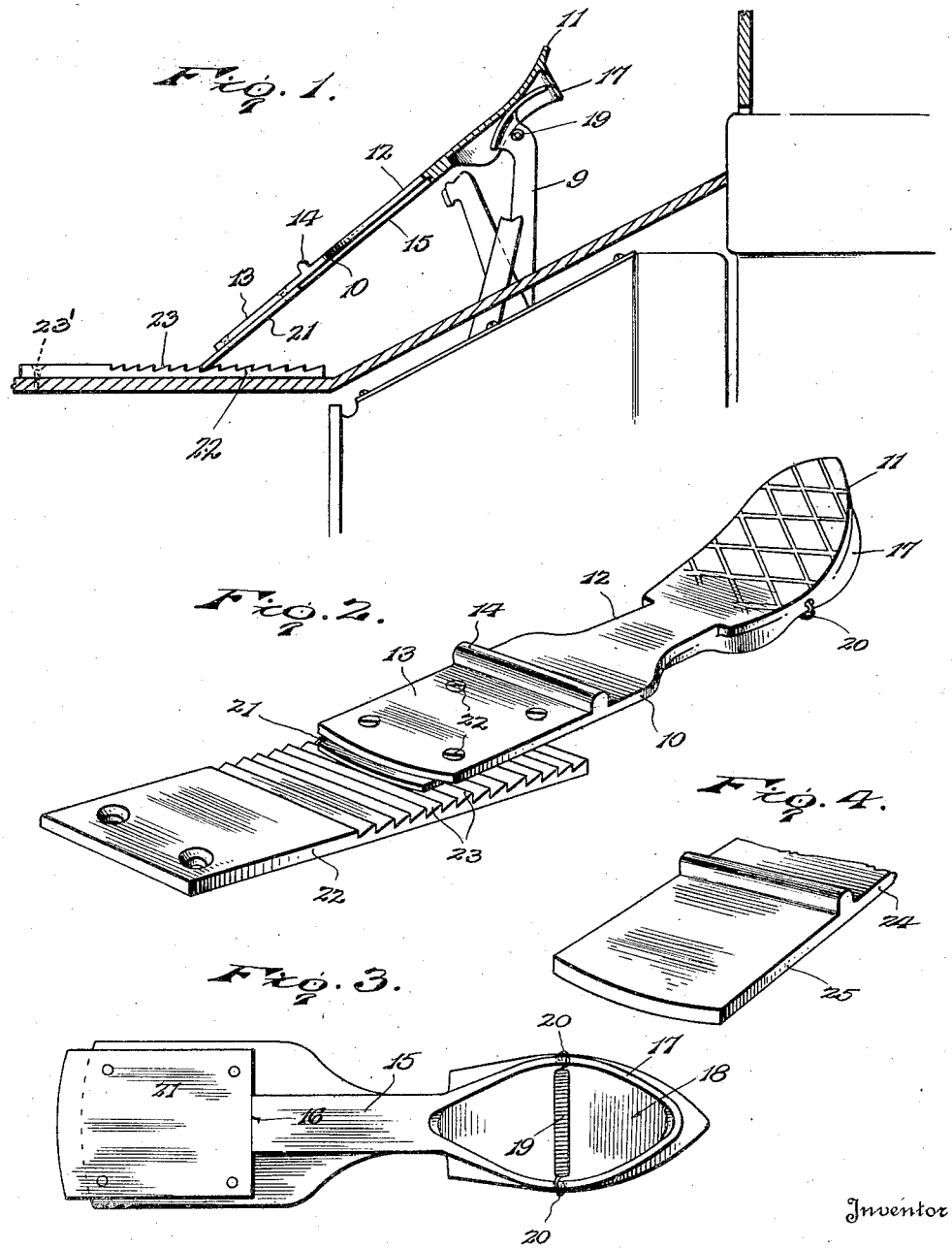

1,487,385

UNITED STATES PATENT OFFICE.

HEBER HOY, OF PARKERSBURG, WEST VIRGINIA, ASSIGNOR OF FIVE-EIGHTHS TO IDEAL SALES COMPANY, OF PARKERSBURG, WEST VIRGINIA.

PEDAL LATCH FOR MOTOR VEHICLES.

Application filed March 8, 1923. Serial No. 623,740.

*To all whom it may concern:*

Be it known that I, HEBER HOY, a citizen of the United States, residing at Parkersburg, in the county of Wood and State of West Virginia, have invented certain new and useful Improvements in Pedal Latches for Motor Vehicles, of which the following is a specification.

This invention relates to an improved clutch pedal latch for motor vehicles and seeks, among other objects, to provide an extremely simple and, at the same time, entirely efficient device of this character which may be readily manipulated by the foot for locking the clutch pedal of the vehicle in neutral position or locking the pedal in position rendering the low speed of the vehicle transmission active.

The invention has as a further object to provide a device which will be strong and durable and which will be reinforced to withstand the stresses thereon.

And the invention has as a still further object to provide a device which may be readily applied with a minimum of difficulty.

Other and incidental objects will appear hereinafter.

In the drawings:

Figure 1 is a sectional view showing my improved device applied to the low speed pedal of a Ford vehicle, Figure 2 is a perspective view showing the device in detail, Figure 3 is a bottom plan view of the foot plate of the device, and Figure 4 is a fragmentary perspective view showing a slightly modified form of foot plate.

As is well known, inconvenience is, at present, experienced in the operation of a Ford vehicle due to the fact that the clutch pedal of the vehicle must, when it is desired to coast, be held in neutral position by the foot and similarly, when it is desired to render the low speed of the vehicle transmission active, must be held in a forward position by the foot. Since the pedal is spring returned, it, therefore, becomes not only inconvenient but also tiresome to hold the pedal in the desired position, and this is particularly true when operating the vehicle at low speed since the pedal must be pushed forwardly with considerable force.

The invention, therefore, seeks to provide a simple and efficient device which may be readily applied to the pedal for locking the pedal in the desired position of adjustment. In Figure 1 of the drawings, I have shown the device applied to the low speed clutch pedal 9 of a Ford vehicle. However, as will appear as the description proceeds, the device may also be used with equally good results upon the brake pedal and I do not, therefore, wish to be limited in this regard.

In carrying the invention into effect, I provide a foot plate 10 curved upwardly at its forward end to form a toe portion 11, at the base of which the plate is notched away at opposite edges to define an instep portion 12. At its rear end the plate provides a flat heel portion 13 and upstanding from the plate at the forward end of the heel portion is a transversely disposed rib or heel rest 14. As brought out in Figure 1, the plate is straight and flat throughout the major portion of its length, being curved upwardly at the tip of the toe portion only and formed on the plate at its lower side is, as shown in Figure 3, a medially disposed longitudinally extending reinforcing rib 15 terminating in the rear of the plane of the rib 14 to define a stop shoulder 16. At the base of the toe portion 11, the rib is bifurcated to provide a flange 17 depending from the margin of the toe portion to define an ovate socket 18 and, as will be observed, the flange is widened toward the ends of the socket. As shown in Figure 1, the socket is shaped to freely accommodate the foot plate of the pedal 9 so that the toe portion of the foot plate 10 will rest against the foot plate of the pedal and extending between the side portions of the flange 17 of the socket and through the upper end portion of the pedal is a medially disposed spring 19 pivotally connecting the foot plate 10 with the pedal. The spring 19 is provided at its ends with loops 20 removably engaged through suitable openings in the flange 17 so that the spring may be readily attached or detached for applying or removing the foot plate and, as will be appreciated, the spring will serve to yieldably connect the foot plate with the pedal and will tend to absorb any undue shock upon the foot plate incident to sudden release of pressure thereon by the foot with consequent backward throw of the pedal 9. Mounted upon the heel portion 13 of the foot plate at its lower side is a flat pawl plate 21 abutting the stop shoulder 16 of the reinforcing rib 15 so that said rib will sustain the thrust against the pawl plate and extending through the foot plate is a plurality of cap screws 22 threaded into the pawl plate for securing the pawl plate in position. At its rear end, the pawl plate projects somewhat beyond the rear end of the foot plate and is preferably provided with a curved edge. Mounted upon one of the floor boards of the vehicle in the rear of the pedal 9 is a flat rack plate 22 secured to the floor board by screws or other suitable fastening devices 23 extending through the rear end of the plate and formed on the plate at its forward end portion are forwardly beveled teeth 23 presenting straight flat shoulders for engagement by the pawl plate 21, while, when the foot plate 10 is shifted forwardly, the pawl plate will readily ride over the beveled faces of the teeth.

As will now be readily seen in view of the preceding description, the foot of the operator may be readily engaged with the foot plate 10 for rocking the pedal 9 forwardly in the usual manner when the foot plate may then be tilted rearwardly upon the pedal to engage the pawl plate 21 with the rack plate 22 for locking the pedal in the desired position. Similarly, to release the pedal, a slight forward pressure is exerted upon the foot plate, when the foot plate may be rocked forwardly to disengage the pawl plate from the rack plate, when the pedal may be allowed to return as may be desired. As will be observed, the teeth 23 occupy the major portion of the length of the rack plate so that the pedal may be locked in neutral position or may be locked in position rendering the low speed gear of the transmission active. However, the rear end portion of the plate is smooth so that when the pedal occupies its normal position, in which position of the pedal the high speed of the vehicle is active, the pawl plate 21 will rest upon the smooth portion of the rack plate.

In Figure 4 of the drawings, I have illustrated a slight modification of the invention wherein the pawl plate is eliminated. In this modification, the foot plate, indicated at 24, is provided with a heel portion 25, as in the preferred construction. However, the heel portion 25 is formed at its end edge to cooperate with the rack plate 22, thus eliminating the necessity for the pawl plate.

Having thus described the invention, what is claimed as new is:

1. A pedal latch for motor vehicles including a foot plate, yieldable means for pivotally connecting said plate with the pedal, and means to cooperate with the foot plate locking the pedal when rocked forwardly.

2. A pedal latch for motor vehicles including a foot plate, yieldable means for pivotally connecting the foot plate near its forward end with the pedal, and means to cooperate with the rear end of the foot plate for locking the pedal when rocked forwardly.

3. A clutch pedal latch for motor vehicles including a foot plate provided at its forward end with a depending flange defining a socket to accommodate the foot plate of the pedal, means engaging said flange for pivotally connecting said first mentioned foot plate with the pedal, and means to cooperate with the former foot plate for locking the pedal when rocked forwardly.

4. A clutch pedal latch for motor vehicles including a foot plate, a spring for yieldably and pivotally connecting the foot plate with the pedal, and means to cooperate with the plate for locking the pedal when rocked forwardly.

5. A clutch pedal latch for motor vehicles including a foot plate provided at one end with a socket to accommodate the foot plate of the pedal and formed with a reinforcing rib extending longitudinally of the plate rearwardly from said socket, means associated with the socket for pivotally connecting said first mentioned plate with the pedal, and means to cooperate with the former plate for locking the pedal when rocked forwardly.

6. A clutch pedal latch for motor vehicles including a foot plate provided with a socket to fit over the upper end of the pedal and formed with a reinforcing rib extending longitudinally of the plate rearwardly from said socket and terminating in a stop shoulder, means associated with said socket for pivotally connecting the foot plate with the pedal, a pawl plate on the foot plate abutting said shoulder, and a rack plate to cooperate with the pawl plate for locking the pedal when rocked forwardly.

In testimony whereof I affix my signature.

HEBER HOY. [L. S.]